Figure 1:
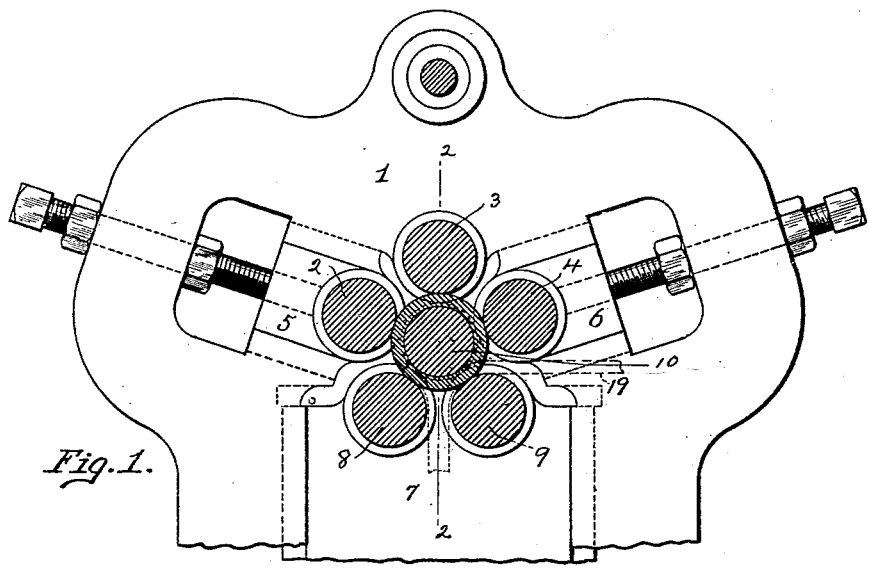

No. 653,913. Patented July 17, 1900.
D. HEGGIE.
APPARATUS FOR FORMING PIPE COUPLINGS OR SIMILAR ARTICLES.
(Application filed Oct. 14, 1899.)
(No Model.)

Witnesses:
Walter Jamariss
Harry G. Wiseman

Inventor:
David Heggie
By Kay & Totten
Attorneys

THE NORRIS PETERS CO., PHOTO-LITHO., WASHINGTON, D. C.

UNITED STATES PATENT OFFICE.

DAVID HEGGIE, OF McKEESPORT, PENNSYLVANIA, ASSIGNOR TO THE NATIONAL TUBE COMPANY, OF NEW YORK, N. Y., AND PITTSBURG, PENNSYLVANIA.

APPARATUS FOR FORMING PIPE-COUPLINGS OR SIMILAR ARTICLES.

SPECIFICATION forming part of Letters Patent No. 653,913, dated July 17, 1900.

Application filed October 14, 1899. Serial No. 733,597. (No model.)

*To all whom it may concern:*

Be it known that I, DAVID HEGGIE, a resident of McKeesport, in the county of Allegheny and State of Pennsylvania, have invented a new and useful Improvement in Apparatus for Forming Pipe-Couplings or Similar Articles; and I do hereby declare the following to be a full, clear, and exact description thereof.

My invention relates to apparatus for the manufacture of pipe-couplings, thread-protectors, and similar articles, its object being to provide suitable apparatus by which the material used in forming such articles can be employed in larger bulk or body relative to the articles formed and a larger number of such articles be produced at one welding operation. The usual custom in forming such articles has been to roll the metal to approximately the desired width for a single article and then to cut it in suitable lengths and to weld each article separately. This required a much greater reduction of the metal in order to bring it to the necessary section, and the rolling of the small bars was a matter of considerable expense in the production of such couplings. Each coupling or protector was then welded separately, requiring separate heating and separate feeding to the machine, all of which increased the labor and cost of the same still further. In an application filed by me of even date herewith, Serial No. 733,595, I have set forth and claimed a method of forming these couplings or like articles consisting in heating a bar corresponding in width to two or more such couplings and at one operation welding the same into ring form and finishing the bodies of several couplings from such bar. The present invention relates to apparatus suitable for practicing this method; and it consists, generally stated, in rolls for forming such couplings or like articles having a plain-faced central mandrel corresponding in diameter to the interior of the blank to be formed and adapted to support the same and a cluster of rolls around the same, such rolls having working faces corresponding to the width of two or more couplings and annular projections intermediate of their working faces to finish the end faces of the couplings to be produced.

To enable others skilled in the art to employ my invention, I will describe the same more fully, referring to the accompanying drawings, in which—

Figure 2:
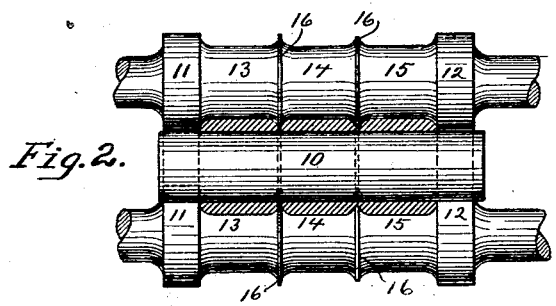
Figure 3:
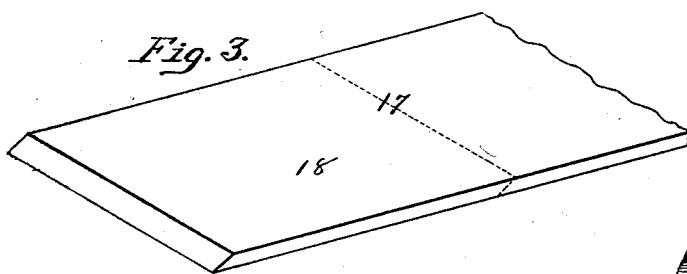
Figure 4:
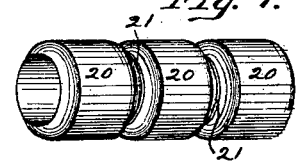
Figure 5:

Figure 1 is a vertical cross-section of apparatus embodying the invention. Fig. 2 is a longitudinal section on the line 2 2, Fig. 1. Fig. 3 shows the bar from which the couplings are formed, indicating by dotted lines the size of the blanks cut from the bar so as to be welded into couplings. Fig. 4 illustrates the welded couplings where they are connected by thin webs, and Fig. 5 illustrates the finished welded couplings separated from each other.

Like figures of reference indicate like parts in each of the views.

My invention has been employed more particularly in forming pipe-couplings and pipe-thread protectors or collars, and the invention will be illustrated in connection with the same.

The apparatus embodying the invention is preferably provided with a cluster of five rolls mounted in a suitable housing 1 of the usual construction employed with a cluster of rolls for the welding of single blanks, except that it is of greater width. Mounted in this housing are the rolls 2, 3, and 4, which in the welding operation are usually held stationary, the roll 3 being mounted in a fixed bearing, while the rolls 2 and 4 are mounted in adjustable bearings 5 6, so that they can be brought to proper relative position with the other rolls in the cluster. Below the said rolls is the sliding bearing 7, which has mounted at its upper end the rolls 8 and 9, so forming the five rolls of the cluster. Fitting within said several rolls is the mandrel 10, which is inserted within the cluster before the metal is fed to the rolls and is withdrawn by hand after the welding operation. The several rolls of the cluster have the end flanges 11 and 12, adapted to bear upon the mandrel 10, which is of practically the same diameter throughout, and within said flanges two or more working faces, each corresponding in width and shape to the finished coupling to be produced. For instance, each roll has three working faces 13, 14, and 15, these working faces being separated by the outwardly-projecting annular ribs 16, which extend around the rolls and the edges of which are formed of such contour as to properly finish the end faces of the couplings to be produced. It is preferred that the ribs 16 shall not be of any great width, especially where the bar fed to the rolls is of the same general thickness throughout instead of having the depressions corresponding to the spaces between the rolls partially produced in the rolling operation by which the bar was produced. In the former case it is desirable that the annular projecting ribs shall easily swage down the metal in both welding the blank into ring form and separating it into several couplings and therefore that the ribs shall not be of any great width. The annular ribs 16 may either project to the same height as the end flanges 11 and 12, so as to contact with the mandrel 10, in which case the rolling operation completely separates the several couplings produced, as shown in the flange to the left of Fig. 2, or may be of slightly-less height, which will leave a thin web connection between the several couplings. In the latter case the couplings can be separated in any desired way, but they are preferably separated by threading the inner surface of the couplings by means of an ordinary threading-tool. The webs are of substantially the same thickness as the depth of the screw-threads, so that when the latter are cut by means of the threading-tool the couplings are easily separated.

In producing couplings in the apparatus above described I take a bar of width equal to the combined width of the different couplings to be produced, and a bar which can therefore be produced at much less cost because of its greater bulk, and cut the same into suitable lengths, the bar being shown at 17 and the length for each welding operation at 18. The blanks are then placed in a suitable furnace and raised to a welding heat and fed to the rolls between a suitable pair in the cluster, such as shown at dotted lines 19 in Fig. 1, when the blank will be wound around the mandrel 10 by the action of the rolls and as the rolls, revolve they will rotate both mandrel and blank and weld the overlapping edge of the blank together. The flanges 16 will at the same time be forced into the blank, so finishing the end faces of the different couplings to be produced through the curved or inclined faces of such ribs 16 and through such flanges separating the blank into a series of couplings either connected by thin webs or entirely separated, the former being shown in Fig. 4, where the couplings are marked 20 and the thin webs connecting them 21, and the latter in Fig. 5, where the couplings themselves are marked 22. In this way with the apparatus above described I am enabled to produce several couplings with no more labor than heretofore required in producing a single coupling and to employ material for making the same which is less costly, because it is not necessarily rolled to such small section from the original billet or ingot, and I therefore effect a material saving in the cost of the couplings.

It will be observed that the end flanges on the rolls are located at a distance apart corresponding to the width of the blank, thereby confining said blank and preventing any side or lateral flow of the heated metal, while the cluster of rolls about the mandrel confine the blank against radial expansion, thereby preventing an enlargement of the couplings. By these means couplings are formed in which the joint is securely welded, which are completely shaped and finished, and which are absolutely of a uniform size.

What I claim as my invention, and desire to secure by Letters Patent, is—

1. In a mill for welding and shaping a plurality of pipe-couplings or like articles at a single operation, the combination of a plain-faced central mandrel corresponding in diameter to the interior of the blank and adapted to support the same, and a cluster of rolls around the mandrel, such rolls having flanges at each end adapted to contact with the mandrel and confine the blank, and also having two or more working faces, each corresponding to a finished coupling, and annular projections intermediate the working faces for finishing the end faces of the couplings.

2. In a mill for welding and shaping a plurality of couplings, or like articles, at a single operation, the combination of a plain-faced central mandrel corresponding in diameter to the interior of the blank and adapted to support the same, and a cluster of rolls around the mandrel, such rolls having flanges at each end, and also having two or more working faces, each corresponding to a finished coupling, and annular projections intermediate the working faces for finishing the end faces of the couplings, said annular projections being of such height as to leave a web between the couplings of substantially the thickness of the depth of screw-threads.

In testimony whereof I, the said DAVID HEGGIE, have hereunto set my hand.

DAVID HEGGIE.

Witnesses:
A. Z. NEWLIN,
RICHARD JAMES.